US012331922B2

(12) United States Patent
Chen et al.

(10) Patent No.: US 12,331,922 B2
(45) Date of Patent: Jun. 17, 2025

(54) AREA OPTICAL COVER WITH FACETED SURFACE

(71) Applicant: ABL IP Holding LLC, Atlanta, GA (US)

(72) Inventors: Jie Chen, Snellville, GA (US); Melissa Ricketts, Conyers, GA (US)

(73) Assignee: ABL IP Holding LLC, Atlanta, GA (US)

(*) Notice: Subject to any disclaimer, the term of this patent is extended or adjusted under 35 U.S.C. 154(b) by 0 days.

(21) Appl. No.: 17/826,703

(22) Filed: May 27, 2022

(65) Prior Publication Data

US 2022/0282849 A1 Sep. 8, 2022

Related U.S. Application Data

(63) Continuation of application No. 16/813,103, filed on Mar. 9, 2020, now Pat. No. 11,346,526.

(60) Provisional application No. 62/815,695, filed on Mar. 8, 2019.

(51) Int. Cl.

| | |
|---|---|
| ***F21V 5/00*** | (2018.01) |
| ***F21V 3/04*** | (2018.01) |
| ***F21Y 103/10*** | (2016.01) |
| ***F21Y 115/10*** | (2016.01) |

(52) U.S. Cl.

CPC .............. *F21V 5/002* (2013.01); *F21V 3/049* (2013.01); *F21Y 2103/10* (2016.08); *F21Y 2115/10* (2016.08)

(58) Field of Classification Search

CPC . F21V 3/049; F21V 5/002; F21V 5/08; F21Y 2103/10

See application file for complete search history.

(56) References Cited

U.S. PATENT DOCUMENTS

| | | | |
|---|---|---|---|
| 1,941,079 | A | 12/1933 | Exelmans |
| 5,633,623 | A | 5/1997 | Campman |
| 7,467,876 | B2 | 12/2008 | Segawa |
| 7,559,672 | B1 | 7/2009 | Parkyn et al. |

(Continued)

OTHER PUBLICATIONS

U.S. Appl. No. 15/441,940, Non-Final Office Action, Mailed on Jun. 29, 2018, 6 pages.

(Continued)

*Primary Examiner* — Karabi Guharay

(74) *Attorney, Agent, or Firm* — Kilpatrick Townsend & Stockton LLP

(57) ABSTRACT

An area optical cover for a linear light source extends along an axial direction. The optical cover includes a portion of an optical material that forms a constant cross-section transverse to the axial direction. An outer surface of the cross-section is substantially planar, and an inner surface of the cross-section forms a plurality of facets. Each of the facets forms a refractive surface that is configured to refract a corresponding portion of light from the light source, and a return surface that connects the refractive surface with a refractive surface of an adjacent facet. When the outer surface is oriented horizontally on a lower side of the portion of the optical material, and the linear light source is positioned at an installation height above the inner surface, all facets within at least 30 degrees of nadir from the light source are optimized to provide a selected light distribution.

22 Claims, 7 Drawing Sheets

(56) References Cited

U.S. PATENT DOCUMENTS

| | | | | |
|---|---|---|---|---|
| 7,878,690 | B2 | 2/2011 | Kawato et al. | |
| 8,690,380 | B2 | 4/2014 | Sato et al. | |
| 8,944,624 | B2 | 2/2015 | Kim et al. | |
| 8,998,448 | B2 | 4/2015 | Chang | |
| 9,423,097 | B2 | 8/2016 | Haenen et al. | |
| 9,476,566 | B2 | 10/2016 | Lu et al. | |
| 9,822,951 | B2 | 11/2017 | Lu et al. | |
| D822,885 | S | 7/2018 | Tweel et al. | |
| 10,317,021 | B2 | 6/2019 | Magno et al. | |
| 10,655,803 | B2 | 5/2020 | Magno et al. | |
| 10,935,211 | B2 * | 3/2021 | Castillo | F21V 5/002 |
| 11,002,425 | B1 | 5/2021 | Chen et al. | |
| 11,346,526 | B1 | 5/2022 | Chen et al. | |
| 2013/0176722 | A1 | 7/2013 | Lay et al. | |
| 2015/0029717 | A1 * | 1/2015 | Shen | F21V 3/049<br>362/297 |
| 2015/0362132 | A1 | 12/2015 | McCane et al. | |
| 2016/0025905 | A1 | 1/2016 | Teather et al. | |
| 2017/0051895 | A1 | 2/2017 | Gielen et al. | |
| 2017/0268744 | A1 | 9/2017 | Hsia | |
| 2018/0328546 | A1 | 11/2018 | Xu et al. | |
| 2019/0186710 | A1 | 6/2019 | Lim et al. | |
| 2019/0277459 | A1 | 9/2019 | Magno et al. | |

OTHER PUBLICATIONS

U.S. Appl. No. 15/441,940, Notice of Allowance, Mailed on Jan. 31, 2019, 10 pages.
U.S. Appl. No. 15/441,940, Response to Non-Final Office Action, Mailed on Sep. 18, 2018, 9 pages.
U.S. Appl. No. 16/421,422, Non-Final Office Action, Mailed on Sep. 3, 2019, 6 pages.
U.S. Appl. No. 16/421,422, Notice of Allowance, Mailed on Jan. 10, 2020, 8 pages.
U.S. Appl. No. 16/812,937, Corrected Notice of Allowability, Feb. 10, 2021, 3 pages.
U.S. Appl. No. 16/812,937, Non-Final Office Action, Mailed on Sep. 25, 2020, 14 pages.
U.S. Appl. No. 16/812,937, Notice of Allowance, Mailed on Jan. 22, 2021, 9 pages.
U.S. Appl. No. 16/813,103, Final Office Action, Mailed on Nov. 15, 2021, 7 pages.
U.S. Appl. No. 16/813,103, First Action Interview Office Action Summary, Mailed on May 19, 2021, 2 pages.
U.S. Appl. No. 16/813,103, First Action Interview Pilot Program Pre-Interview Communication, Mailed on Mar. 15, 2021, 4 pages.
U.S. Appl. No. 16/813,103, Notice of Allowance, Mailed on Feb. 2, 2022, 7 pages.

* cited by examiner

FIG. 2A
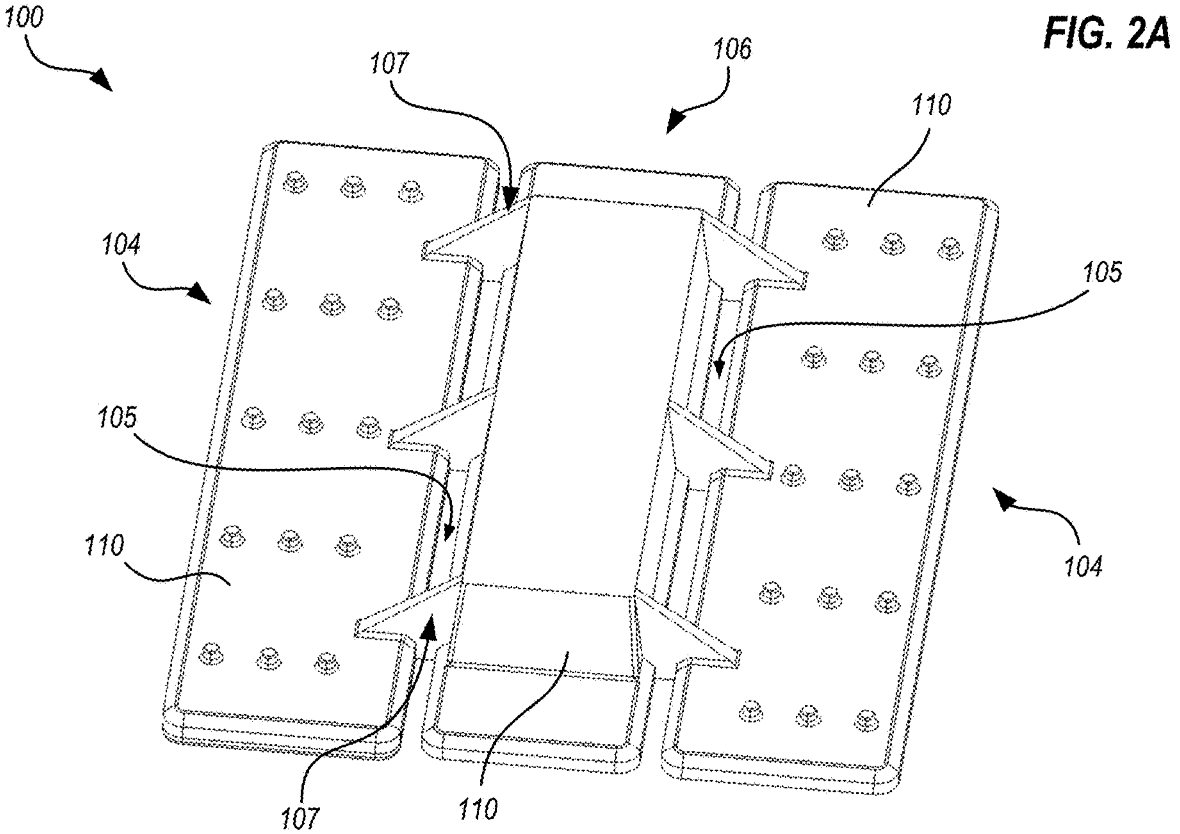
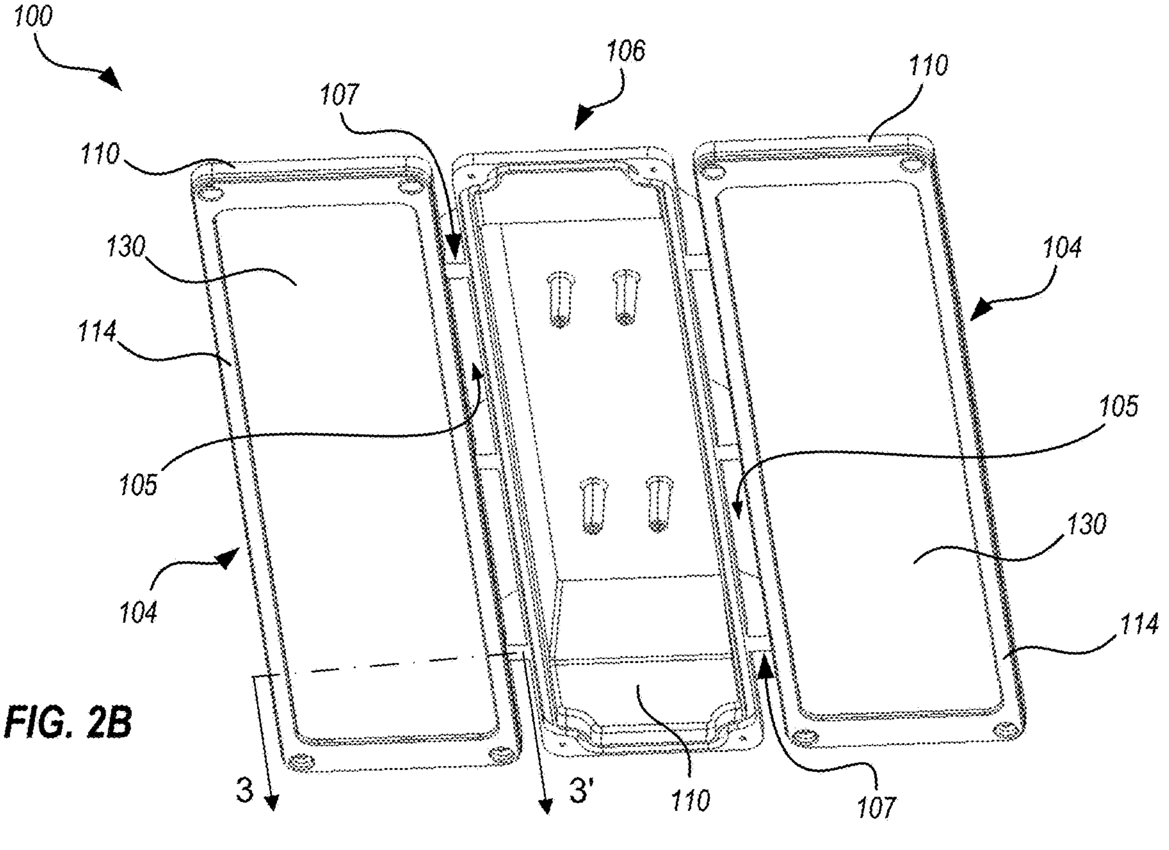
FIG. 2B

FIG. 5
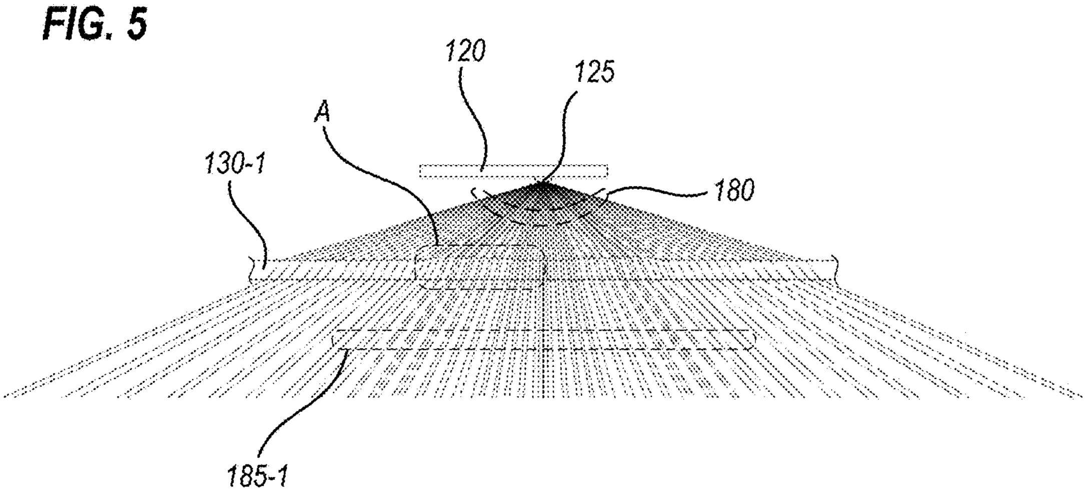
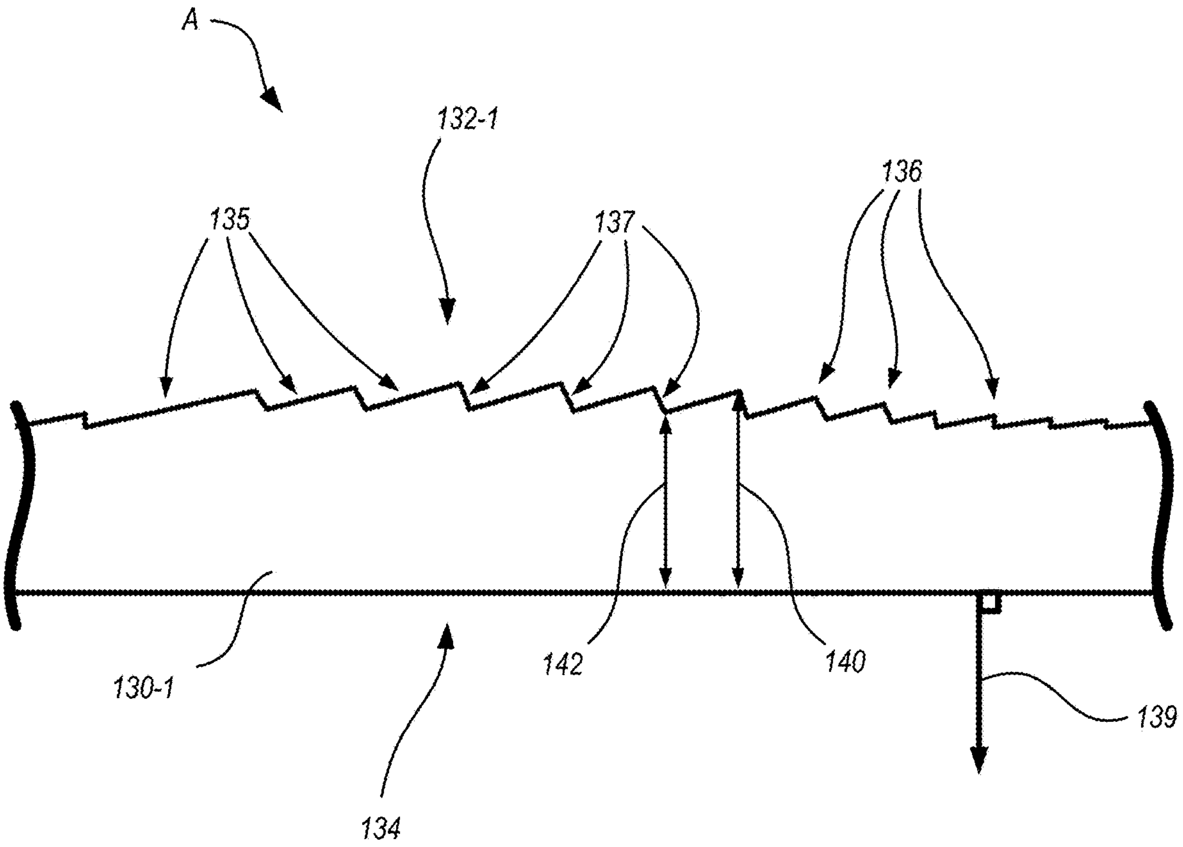
FIG. 6

AREA OPTICAL COVER WITH FACETED SURFACE

CROSS-REFERENCE TO RELATED APPLICATIONS

This application is a continuation of U.S. application Ser. No. 16/813,103, Area Optical Cover with Faceted Surface, filed 9 Mar. 2020, which is a non-provisional application of, and claims priority to, U.S. Provisional Patent Application Ser. No. 62/815,695, filed 8 Mar. 2019, which is incorporated by reference herein in their entirety for all purposes.

BACKGROUND

Some lighting applications are based on essentially linear light sources, such as fluorescent tubes or light-emitting diodes (LEDs) that are arranged in a row. In some cases, multiple linear light sources are installed parallel with one another, within a single housing. Allowing light from the light source(s) to emit light in uncontrolled directions can be inefficient and/or harmful in that light is not placed where it is needed and/or kept away from directions where it is undesirable. Thus, some of these applications benefit from optics to tailor the distribution of light. However, certain types of optics can be heavy and/or costly (e.g., from using large volumes of refractive optical material), inefficient (absorbing some of the light and turning it into heat) and/or unsightly (providing a visually "busy" appearance, generating high angle light that is perceived as glare, and the like).

SUMMARY

In an embodiment, an area optical cover for a linear light source extends along an axial direction. The optical cover includes a portion of an optical material that forms a constant cross-section transverse to the axial direction. An outer surface of the cross-section is substantially planar, and an inner surface of the cross-section forms a plurality of facets. Each of the facets forms a refractive surface that is configured to refract a corresponding portion of the light from the light source, and a return surface that connects the refractive surface with a refractive surface of an adjacent facet. When the outer surface is oriented horizontally on a lower side of the portion of the optical material, and the linear light source is positioned at an installation height above the inner surface, all facets within at least 30 degrees of nadir from the light source are optimized to provide a selected light distribution.

In an embodiment, an area optical cover for a linear light source extends along an axial direction, includes a portion of an optical material that forms a constant cross-section transverse to the axial direction. The outer surface of the cross-section is substantially planar, so as to define a normal direction extending therefrom. A portion of the inner surface of the cross-section forms a plurality of facets. Each of the facets forms a refractive surface that is configured to refract a corresponding portion of light from the linear light source, and a return surface that connects the refractive surface with a refractive surface of an adjacent facet. For each first selected refractive surface that forms a positive angle with respect to the normal direction, each return surface that adjoins the first selected refractive surface forms an angle that is either vertical, or negative with respect to the normal direction. For each first selected refractive surface that forms a negative angle with respect to the normal direction, each return surface that adjoins the first selected refractive surface forms an angle that is either vertical, or positive with respect to the normal direction.

BRIEF DESCRIPTION OF THE DRAWINGS

The present disclosure is described in conjunction with the appended figures:

FIGS. 2A and 2B are schematic, top and bottom isometric views respectively, illustrating certain components of the light fixture of FIG. 1, in accord with one or more embodiments.

FIG. 5 schematically illustrates optical performance of a portion of an area optical cover that can be used with the light fixture of FIG. 1, in accord with one or more embodiments.

FIG. 6 schematically illustrates facets, and features thereof, in an enlarged view of section A of an area optical cover, in accord with one or more embodiments.

DETAILED DESCRIPTION

Figure 1:
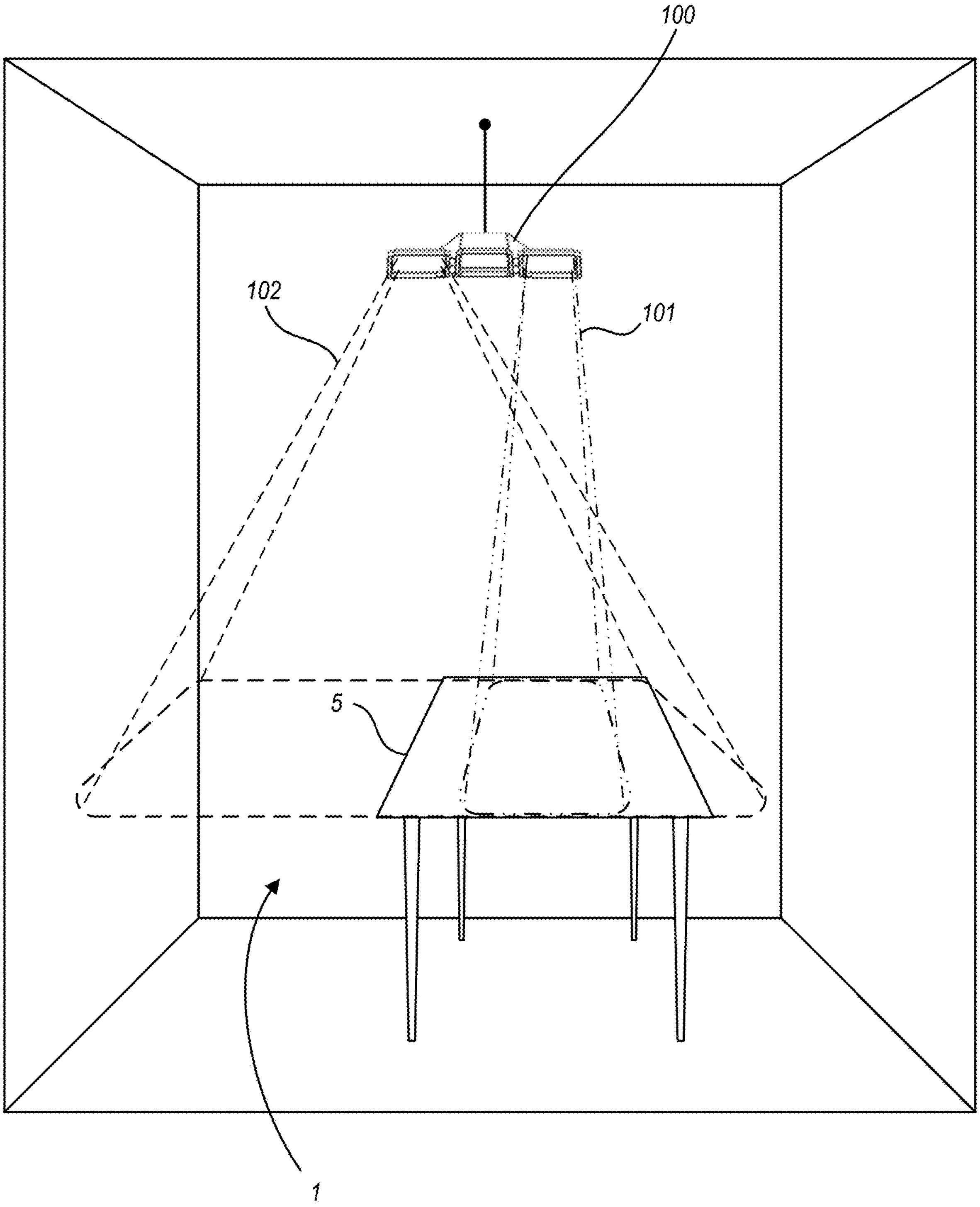
FIG. 1 schematically illustrates a light fixture having one or more area optical covers with faceted surfaces, illuminating portions of a space, in accord with one or more embodiments.

The present disclosure may be understood by reference to the following detailed description taken in conjunction with the drawings described below, wherein like reference numerals are used throughout the several drawings to refer to similar components. It is noted that, for purposes of illustrative clarity, certain elements in the drawings may not be drawn to scale. In instances where multiple examples of an item are shown, only some of the examples may be labeled, for clarity of illustration. Specific instances of an item may be referred to by use of a numeral followed by a dash and a second numeral (e.g., area optical covers 130-1, 130-2, 130-3) while numerals not followed by a dash refer to any such item (e.g., area optical covers 130).

The present disclosure refers descriptions such as "up," "down," "above," "below" and the like that are intended to convey their ordinary meanings in the context of the orientation of the drawings being described, notwithstanding that the apparatus disclosed may be manufactured and/or installed in other orientations.

Embodiments herein provide new and useful lighting modalities based on area optical covers having internal faceting. Several embodiments are contemplated and will be discussed, but embodiments beyond the present discussion, or intermediate to those discussed herein are within the scope of the present application. Area optical covers as described herein may be utilized in free-standing, pole-mounted, wall-mounted and/or ceiling-mounted luminaires, and may be utilized for indoor and/or outdoor lighting.

Embodiments herein appreciate that area optical covers for linear light fixtures can advantageously combine optical, protection and reconfiguration functionalities that are typically provided by a combination of prior art optics and outer covers. In this context, an "area optical cover" is one that does not wrap around its respective light source(s), but instead is a roughly planar cover that is installed over or under the light sources so as to protect the light sources (see also FIGS. 2B, 3A, and 4). In these embodiments, a portion of optical material uses faceting of the section's cross-sectional profile to redirect light passing therethrough. The faceting is advantageously applied to an internal surface of the cross-sectional profile, that is, a surface that faces the light sources, not an opposing surface through which the light exits. This minimizes variations in light in a direct view of the area optical cover when the light sources are turned on, and provides the area optical cover with a substantially smooth outer surface, for best aesthetic appearance. In this sense, "substantially smooth" means visibly smooth to the unaided eye, but the outer surface may be slightly textured to provide light diffusion, as discussed below. Provided in this way, the faceting allows an area optical cover of a light fixture to provide all features that would otherwise typically be provided by a separate optic per light source, plus one or more covers per fixture. In certain ones of these embodiments, light distributions of light fixtures using these area optical covers can be easily altered by replacing only the outside optical cover. That is, in these embodiments, while optics of previous fixtures may not be directly accessible after installation, and would at least require a separate replacement step, area optical covers herein may be relatively accessible after installation. Certain embodiments also feature further refinements for manufacturability, cost savings, convenience and optical performance, as disclosed herein.

FIG. 1 schematically illustrates a light fixture 100 having one or more area optical covers with faceted surfaces, illuminating portions of a space 1. The area optical covers are not labeled in FIG. 1 due to the scale of the drawing (see area optical covers 130, FIGS. 2A-6). In certain embodiments, the area optical covers may be easily removed and replaced, but this is not a requirement. In certain of these, and in certain other embodiments, the area optical covers may form a water resistant or waterproof seal with a housing of light fixture 100, but this also is not a requirement.

By using different area optical covers, one or more portions of light fixture 100 can either project, for example, a narrow light distribution 101 (shown as lighting part of a table 5 below light fixture 100), a wide light distribution 102 (shown as extending much further laterally than light distribution 101), and/or other distributions not shown in FIG. 1. The shapes and edges of light distributions 101 and 102 are shown for purposes of illustration only; light distributions achievable with area optical covers herein can vary significantly from those shown, may be symmetric or asymmetric with respect to nadir with respect to the area optical cover, and edges of such distributions may be bounded not by edges of the character suggested by FIG. 1, but by more diffuse edges.

Figure 3A:
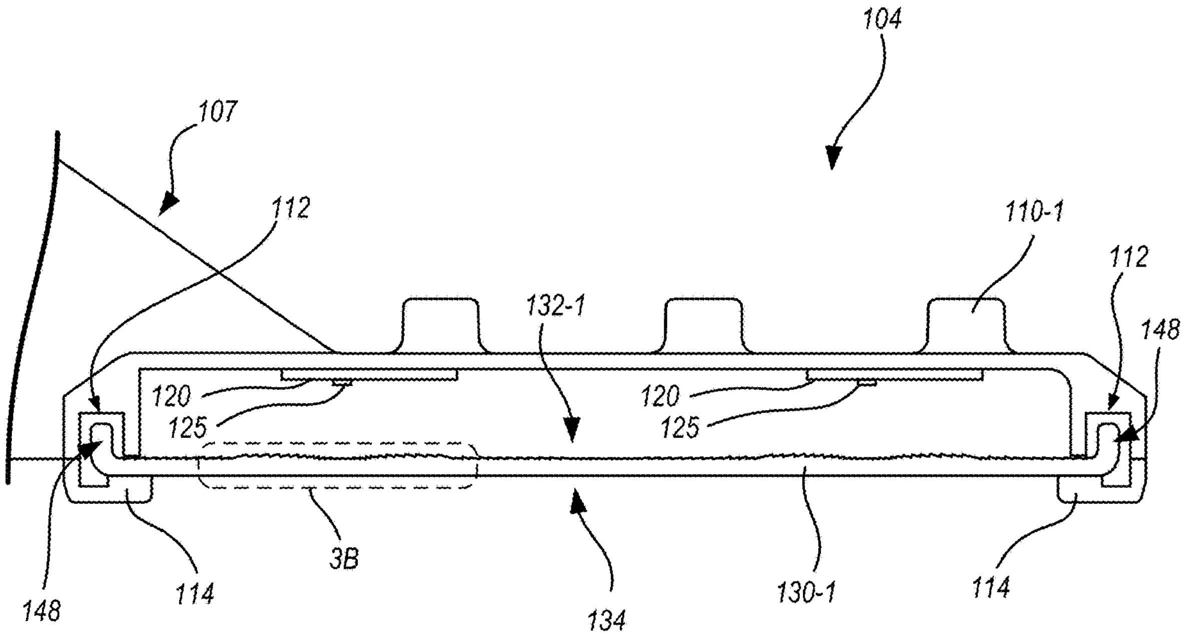
FIG. 3A is a schematic cross-section of one light-emitting module, in accord with one or more embodiments.

FIGS. 2A and 2B are schematic, top and bottom isometric views respectively, illustrating certain components of a light fixture 100. The illustrated embodiment includes a housing 110 that forms part of two light-emitting modules 104, an electronics module 106 and connectors 107 therebetween. The number and placement of light-emitting modules 104 and electronics module 106 are exemplary only; other embodiments may have more or fewer light-emitting modules 104, and may not include electronics module 106. When electronics module 106 is included, it is advantageously in a separate housing portion with connectors 107 spanning air gaps 105 between light-emitting modules 104 and electronics module 106, as shown. Only exemplary ones of air gaps 105 and connectors 107 are labeled within FIGS. 2A and 2B, for clarity of illustration, and electronics module 106 is shown without electronics and without a cover that would typically be installed to hide and protect the electronics. FIG. 3A provides a cross-section of one light-emitting module 104, taken at line 3-3' shown in FIG. 2B.

FIG. 2B also illustrates area optical covers 130. Area optical covers 130 have downward facing surfaces that are substantially planar, as shown in FIG. 2B, but have upward facing surfaces with facets that shape light from sources within light-emitting modules 104, as discussed below. A cover ring 114 and fasteners (see FIG. 4) may be used to hold area optical covers 130 in place with housing 110. Specific ones of area optical covers 130 may be optimized to provide specific light distributions, as discussed below.

Advantageously, air gaps 105 may provide a separation between light-emitting modules 104 and electronics module 106 to reduce heat propagation from electronics module 106 to light-emitting modules 104. That is, although connectors 107 may conduct some heat, they also force the heat that is transferred through narrow heat-conductive areas, and they dissipate some of the heat directly to air that flows upward through air gaps 105.

It is emphasized that the illustrated forms of all components shown in the drawings herein are representative only, and may be changed in type, size and number without limitation. That is, although the illustrated forms are those of a specific light fixture as an aid to understanding, the principles explained herein can be applied to many other configurations of light fixtures. One of ordinary skill in the art will readily recognize many alternative features, constructions, modifications and equivalents to the specific embodiments shown in the drawings.

FIG. 3A is a schematic cross-section of one light-emitting module 104, taken at line 3-3', FIG. 2B. Light-emitting module 104 includes a portion of a specific housing 110-1 and two printed circuit boards (PCBs) 120. Each PCB 120 supports and provides power to a plurality of LEDs 125 that serve as light sources. As shown in FIG. 3A, light-emitting module 104 can include two PCBs 120, but one, two or any other number of PCBs can be used with suitable adjustments of housing 110-1, area optical cover 130-1 and other components, as discussed below. PCB 120 is longer in an axial direction (in and out of the plane of FIG. 3A) than a lateral direction (left and right in FIG. 3A) so that LEDs 125 form a linear light source that extends along the axial direction. A portion of area optical cover 130-1 labeled as 3B in FIG. 3A is illustrated in greater detail in FIG. 3B.

A specific area optical cover 130-1 couples with housing 110-1, and a cover ring 114 may be added to help secure area optical cover 130-1 to housing 110-1. Area optical cover 130-1 advantageously combines light shaping with protection of PCB 120 and LEDs 125. In prior art light fixtures, light shaping would usually be accomplished by a primary optic, while protection would usually be provided by a separate outer cover. In order to combine these functions, an inner surface 132-1 of area optical cover 130-1 (that is, the surface of area optical cover 130 that faces LEDs 125, as opposed to an outer surface 134) includes facets (not labeled in FIG. 3A due to the scale of the drawing; see FIG. 6). The facets of inner surface 132-1 are arranged to align with one or more rows of LEDs 125, and extend along the axial direction of area optical cover 130-1 so as to modify the light from the linear light sources provided by rows of LEDs 125, as the light passes through area optical cover 130-1. That is, area optical cover 130-1 includes a portion of an optical material that forms a constant cross-section along the axial direction. The facets can be modified to shape light according to any of several desired light distributions, as discussed further below. Facets typically form locally planar surfaces that refract light from an original propagation direction to another while maintaining directionality of the light according to Snell's Law, that is, the facet surfaces do not simply diffuse the light randomly.

Area optical cover 130-1 also forms one or more coupling features 148 that can engage with one or more corresponding coupling features 112 of housing 110-1, and/or with cover ring 114, to hold area optical cover 130-1 in place. In certain embodiments, coupling features 148 of area optical cover 130-1 and 112 of housing 110 allow easy coupling and decoupling while housing 110-1 is installed in a lighted space or a larger lighting system, but this is not a requirement. In one example, in FIG. 3A, coupling feature 148 is illustrated as a rim that forms a nonzero angle with respect to inner surface 132 and outer surface 134. Configured in this way, coupling feature 148 can then be placed within coupling feature 112, illustrated in FIG. 3A as a groove within housing 110-1. Cover ring 114 is then coupled with housing 110-1 using fasteners, adhesives, snap fittings or the like (e.g., see FIG. 4) so as to retain coupling feature 148 between cover ring 114 and housing 110-1. In embodiments, at least area optical cover 130-1 and housing 110-1 are configured to form a waterproof seal so that light fixture 100 can be used outdoors or in wet indoor environments. Various other features can be incorporated to improve waterproofing, such as use of one or more gasket materials or other sealants in connection with area optical cover 130-1, housing 110-1, cover ring 114, and/or other components. Also, portions of other area optical covers 130 can be made to extend toward a housing 110 so as to provide bracing between what would otherwise be large parallel surfaces. One of ordinary skill in the art will readily recognize many alternative features, constructions, modifications and equivalents to the specific embodiment shown in FIG. 3A.

A wide variety of optical materials can be used to form an area optical cover 130. Advantageous properties of such materials may include transparency, durability, low cost, and stable optical performance over time (e.g., resistance to hazing, yellowing and the like). Certain embodiments may also benefit from resistance to chemical attack, flexibility, low weight, and/or an ability to be formed by molding and/or extrusion. Plastics such as polycarbonate and acrylics are suitable for many embodiments, other embodiments may be formed of glass, and still other materials may be used. Coatings may be applied to either the inner or the outer surface for purposes such as antireflection, polarization control and the like. A small degree of diffusion can also be provided by the bulk material of area optical cover 130-1, or by the finish of outer surface 134, as discussed below.

Figure 3B:
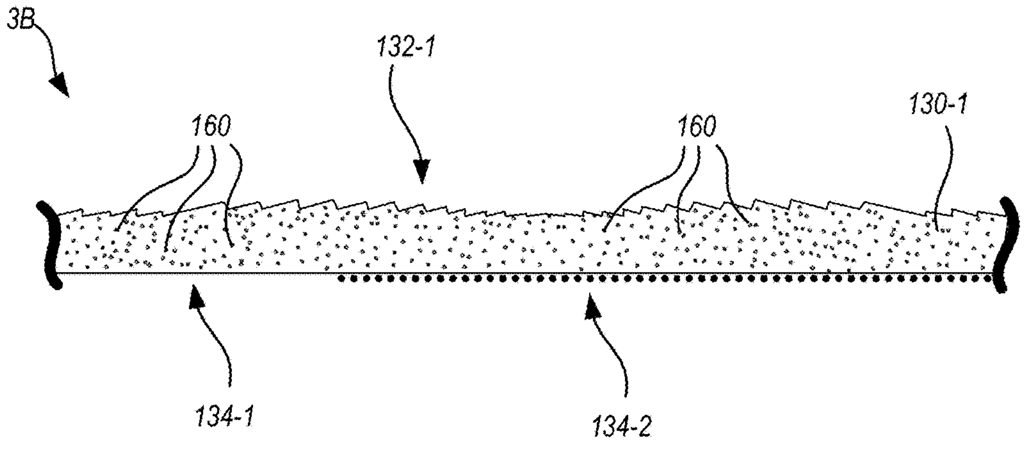
FIG. 3B is an enlarged view of a portion of an optical cover illustrated in FIG. 3A, in accord with one or more embodiments.

FIG. 3B is an enlarged view of portion 3B, as indicated in FIG. 3A, of area optical cover 130-1. Features that may be used by one skilled in the art to create diffusion of the light transmitted through area optical cover 130-1 are now discussed. The specific arrangement of features shown in FIG. 3B is to help explain techniques that can be used to create diffusion, and does not mean that the arrangement shown will or should appear exactly as shown.

FIG. 3B schematically illustrates a portion of area optical cover 130-1 to demonstrates two modalities of adding diffusion to optical characteristics of a faceted area optical cover. A small amount of diffusion is advantageous for color mixing and light pattern smoothing purposes, as discussed below. For example, when light fixtures using optical covers 130 as disclosed herein project light on a relatively plain surface, bands of light attributable to separate facets of the area optical cover 130 may be visible. The angular separations of such bands may be on the order of a few degrees (e.g., an angular range subtended by an optical cover divided by the number of facets in the range, as discussed above). Diffusion that exceeds the angular separation of adjacent bands will tend to widen and merge the bands, to provide a less distracting projection of light. Diffusion that provides less than 20 degrees of beam spreading may be useful for some optical covers, while others can benefit from even less beam spreading, such as 5 degrees. In this sense, a degree of beam spreading is defined as an angular range over which a propagation direction of a light beam spreads, upon interacting with a scattering material or feature, as compared with an initial propagation direction of the light beam. The methods discussed below can be controlled to yield optical covers that provide the small amount of diffusion desired.

Optical cover 130-1 may be formed of an optical material that has scattering sites 160 within the material itself. (Scattering sites 160 are not shown in FIG. 3A for clarity of illustration). Scattering sites 160 may be inclusions of a second material within the optical material, or may represent the action of the optical material itself (e.g., an optical material that is dyed or otherwise has the property of scattering some of the light passing through it). Use of a second material to provide scattering sites 160 provides a number of advantages. For example, using a second material can be very inexpensive, and the concentration of such sites can be easily controlled. In some embodiments, very small amounts of the second material can be added in powder form, to the optical material in liquid form as it is being prepared for molding or extrusion to form area optical cover 130-1. In this approach, the weight of the second material is usually less than about 2% of the total weight of area optical cover 130-1. Alternatively, bubbles of air (or any other material with a refractive index difference, relative to the optical material) can be mixed into the optical material in liquid form. Another advantage of using a second material is to provide color mixing throughout the volume of area optical cover 130-1, for light fixtures that use LEDs of different colors. A slight drawback to using scattering sites 160 in the optical material itself is that more diffusion may be imparted to light that passes through thicker portions of the material (e.g., facets 136, as discussed in connection with FIG. 6). However, controlling peak heights to be no more than a small multiple of valley heights minimizes or eliminates this problem from a practical standpoint (e.g., small differences in a small amount of diffusion are unlikely to be noticeable).

Another way to provide diffusion is through surface texturing. Area optical cover 130-1 schematically illustrates two different outer surface portions, 134-1 and 134-2. Outer surface portion 134-1 is optically smooth such that it does not add diffusion to light passing therethrough. Outer surface portion 134-2 has a textured surface that diffuses light passing therethrough. Outer surface portion 134-2 can be textured by various methods including mechanical, chemical and/or optical (e.g., laser) ablation, by spray coating with a translucent material so as to form an irregular coating, and/or by application of a film that provides diffusion. The mechanical means include using a textured mold or extrusion die to form the optical cover, or treatments such as grinding, sanding or sandblasting of the cover after it is formed. (However, an extrusion die can only provide variations in a cross section of the optical cover, that is, one-dimensional as opposed to two-dimensional texturing). The dots used to indicate outer surface portion 134-2 are for schematic illustration only and do not necessarily represent the physical details of surface texture.

Figure 8:
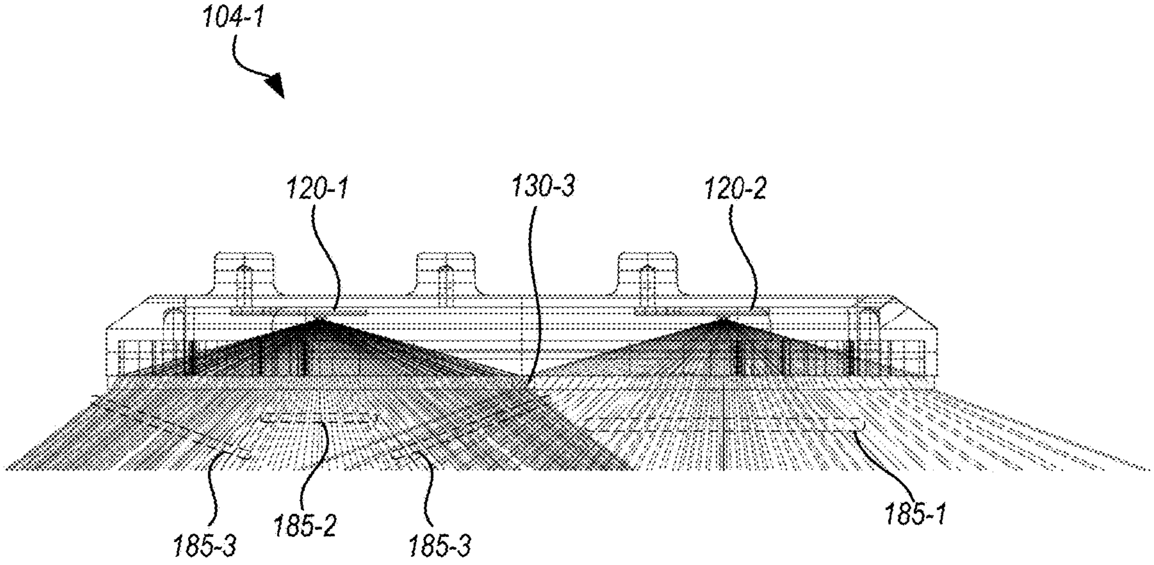
FIG. 8 is a schematic cross-sectional illustration of a light-emitting module with two PCBs, and an area optical cover having facets that are optimized differently for the light sources provided by the two PCBs, in accord with one or more embodiments.

As suggested by FIG. 3B, separate portions of an optical cover outer surface can be textured or not, however of course the entire outer surface can be textured. Local texturing may be preferred when it is desired to provide more diffusion in certain regions of the light projected through an area optical cover 130, than in other regions. However, texturing of outer surface portion 134-2 is generally somewhat more costly than providing scattering sites 160, because outer surface texturing usually requires one or more extra fabrication steps applied to individual area optical covers 130-1, rather than the act of providing a bulk material with scattering sites that can be used to form many individual area optical covers 130-1. It is noted that although FIG. 8 shows both scattering sites 160 and textured outer surface portion 134-2 in the same area optical cover 130-1, and both can be used together, only one of these techniques or the other would typically be used.

Outer surface 134, while generally smooth so as not to disrupt the direction of light scattering therethrough (other than refraction at the smooth surface) may have a diffuse finish so as to further obscure an external view of inner surface 132 of area optical cover 130. The amount of diffusion provided by such finish is advantageously small so that a directionality of light that is refracted by the facets 136 (see FIG. 6) is substantially preserved.

Figure 4:
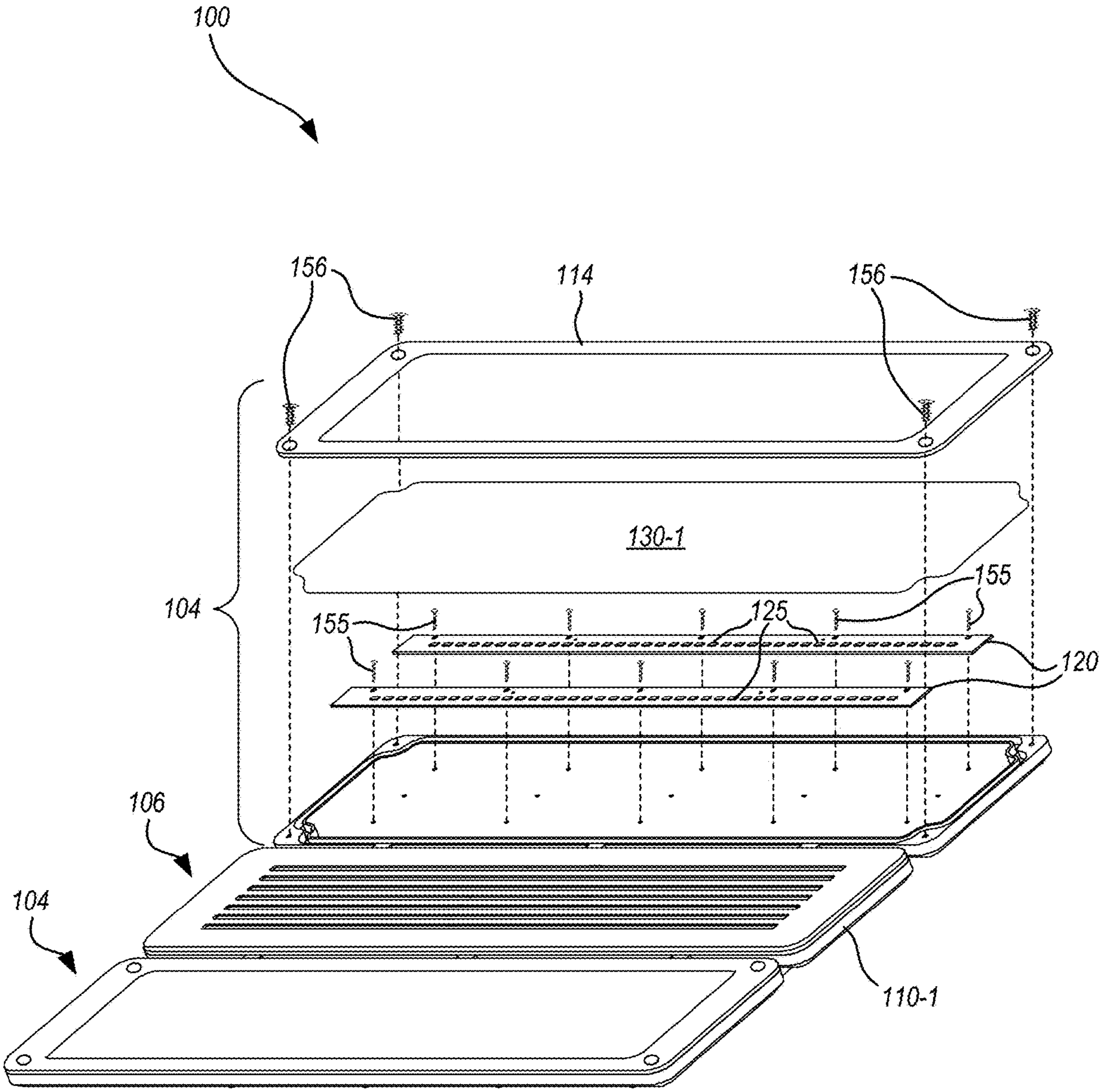
FIG. 4 is a schematic, partially exploded diagram of the light fixture of FIG. 1, in accord with one or more embodiments.

FIG. 4 is a schematic, partially exploded diagram of light fixture 100. One light-emitting module 104 and electronics module 106 are shown in an assembled state, while selected components of a second light-emitting module 104 are shown in exploded view, to illustrate how the light-emitting module 104 could be assembled. In addition to the components shown in FIG. 3A, fasteners 155 and 156 are shown. Fasteners 155 secure PCBs 120 to housing 110-1, and fasteners 156 secure cover ring 114 to housing 110-1. PCBs 120 provide support and electrical power to LEDs 125. Only representative ones of fasteners 155 and LEDs 125 are labeled within FIG. 4, for clarity of illustration. Again, it is emphasized that FIG. 4 illustrates one specific light fixture 100 as an aid to understanding; other forms of housing 110 and fasteners 155 and 156, and ways to couple PCBs 120, area optical covers 130 and cover rings 114 with housing 110, are possible.

FIG. 5 schematically illustrates optical performance of a portion of area optical cover 130-1 (see FIG. 3A) that can be used with light fixture 100. The illustrated portion of area optical cover 130-1 is intended to provide a narrow light distribution (e.g., resembling light distribution 101, FIG. 1). An exemplary LED 125 is shown acting as a source of emitted light 180. Emitted light 180 radiates from LED 125 in a Lambertian profile, thus emitting most energy at angles near nadir, and less (but still some) energy at higher angles from nadir. Because of this, only exemplary rays from LED 125 are shown at high angles. Area optical cover 130-1 forms an outer surface 134 that is substantially smooth, and an inner surface 132-1 having facets 136 that are configured to redirect emitted light 180. Outer surface 134 may be further configured to redirect light 180, such that light 180 will exit area optical cover 130-1 as refracted light 185-1. In FIG. 5, the rays of refracted light 185-1 that are enclosed in a dashed boundary represent over 80% of light power from LED 125, and exit at angles within 30 degrees of nadir to form the desired narrow distribution. A section of area optical cover 130-1 labeled A is shown in enlarged detail in FIG. 6.

FIG. 6 schematically illustrates facets 136, and features thereof, in an enlarged view of section A of area optical cover 130-1. Section A includes several facets 136 on inner surface 132-1. Each facet 136 includes a refractive surface 135 and a return surface 137. Not all instances of facets 136, refractive surface 135 and a return surface 137 are labeled within FIG. 6, for clarity of illustration. Each refractive surface 135 is straight over at least part of its length, and the straight portion is oriented at an angle with respect to an intended location of LED 125 (see FIG. 5), thus being configured to refract emitted light 180 through a desired angle, given knowledge of the material of area optical cover 130-1, and in accordance with Snell's Law. Each return surface 137 connects each facet 136 with refractive surface 135 of an adjacent facet 136. Each facet 136 forms a peak height 140 with respect to outer surface 134, and each pair of adjacent facets forms a valley height 142, as shown.

In embodiments herein, facets 136 are formed with an appreciation of certain constraints on manufacturability of area optical covers 130. For example, in certain embodiments, area optical covers 130 are formed by molding. For best optical performance, it would be possible to design facets 136 with return surfaces 137 that are roughly parallel with emitted light 180. However, this would lead to many facets 136 that extend to one side or the other from a direction 139 that is normal to outer surface, as illustrated in FIG. 6. That is, if a refractive surface 135 of a selected facet 136 had a positive angle with respect to direction 139, and the return surface 137 of the same selected facet 136 also had a positive angle with respect to direction 139, then a peak of the selected facet 136 would overhang the facet adjacent to the return surface 137. (A "positive" slope being defined as a straight line that extends from one height at its left hand end to a higher height at its right hand end, and a "negative" slope being defined as a straight line that extends from one height at its left hand end to a lower height at its right hand end, in the orientation of FIG. 6.) This kind of geometry causes mold release problems, because facets on one side of inner surface 132 would require the mold to be released toward one direction to allow the mold to clear the molded features, while facets on the other side of inner surface 132 would require the mold to be released in the opposite direction. To mitigate this problem, embodiments herein recognize that for each first selected refractive surface that forms a positive angle with respect to normal direction 139, a return surface that adjoins the first selected refractive surface should form an angle that is either parallel with, or negative with respect to normal direction 139. Similarly, for first selected refractive surface that forms a negative angle with respect to normal direction 139, each return surface that adjoins the first selected refractive surface should form an angle that is either parallel with, or positive with respect to normal direction 139.

The number of facets 136, the slopes of refractive surfaces 135 and return surfaces 137, and other parameters can be determined to meet one or more mechanical and/or optical criteria for an area optical cover 130. The mechanical criteria can be selected to promote manufacturability, and can be balanced against optical performance criteria to produce a design that has both good manufacturability and good optical performance. For example, some embodiments meet one or more criteria of minimum area optical cover thickness, maximum ratio of peak height to valley height (for individual peaks/valleys, or aggregates of all peaks/valleys), minimum curvature radius at any point, minimum or maximum number of facets per unit angle relative to light sources, maximum optical efficiency, minimum light in selected areas, and others. Some criteria may apply only within selected regions (such as local sets of facets, larger regions of facets, or angular ranges relative to light sources) while other criteria may apply to an entire cross-section. Some of the mechanical criteria that are met by the embodiment shown in FIGS. 5 and 6 are that for each first selected refractive surface that forms a positive angle with respect to normal direction 139, each return surface that adjoins the first selected refractive surface forms an angle that is either parallel with, or negative with respect to normal direction 139; and for each first selected refractive surface that forms a negative angle with respect to normal direction 139, each return surface that adjoins the first selected refractive surface forms an angle that is either parallel with, or positive with respect to normal direction 139. Also, in the embodiment illustrated, the peak height of any given facet does not exceed 1.3 times the valley height between that facet and any facet adjacent to the given facet. This restriction helps avoid warping and other mechanical effects in injection molding, which can occur when there are large differences in thickness of the injected item. Because the slopes of the facets are important in terms of optical functionality, even small amounts of warping, sinking and the like must be avoided. In this and in other embodiments, this peak-to-valley height ratio restriction may be narrower in that the peak height of any given facet does not exceed 1.3 times the valley height between any two facets (that is, the peak height restriction applies to all valleys between facets, not just valleys adjacent to the tallest peak). Another restriction that promotes optical surfaces conformance to their desired angles is limiting the minimum thickness of an area optical cover 130 at any point; a minimum thickness of 2 mm has been found to be effective. Also, all incoming rays of light 180 that are emitted by LED 125 at an angle of less than 50 degrees from nadir, and enter refractive surfaces 135, are refracted to emerge from outer surface 134 at angles of less than 40 degrees from nadir, so as to produce the desired narrow light distribution (e.g., resembling light distribution 101, FIG. 1). Thus, each given facet is configured to refract each portion of light 180 that passes through the given facet, toward normal direction 139 as opposed to the original propagation direction of the portion of light.

When optical performance of an area optical cover 130 is modeled, light energy of emitted light 180 that falls within various regions can be calculated, given the emission characteristics of LEDs 125 and the angular ranges subtended by the regions. Thus, the net light energy that is optimally refracted can be used as an optical figure of merit for area optical cover 130. This optical figure of merit can be used for optimization purposes, for example, by requiring that the optical figure of merit exceed a given value while other criteria (e.g., the mechanical criteria discussed above) are also met. Requiring some value of the optical figure of merit in combination with the mechanical criteria discussed above provides an advantageous balance to the mechanical criteria alone, which could otherwise be optimized without regard to the objective of directing light as desired by area optical cover 130, thereby sacrificing performance. All physically compatible combinations of the individual mechanical and optical criteria discussed above, are contemplated and are considered within the scope of the present disclosure.

FIGS. 7-12 illustrate additional lighting arrangements that can be realized using area optical covers 130. In FIGS. 7-12, not all features are explicitly labeled for clarity of illustration, but will be readily understood by one skilled in the art due to their resemblance to features labeled in previous drawings.

Figure 7:
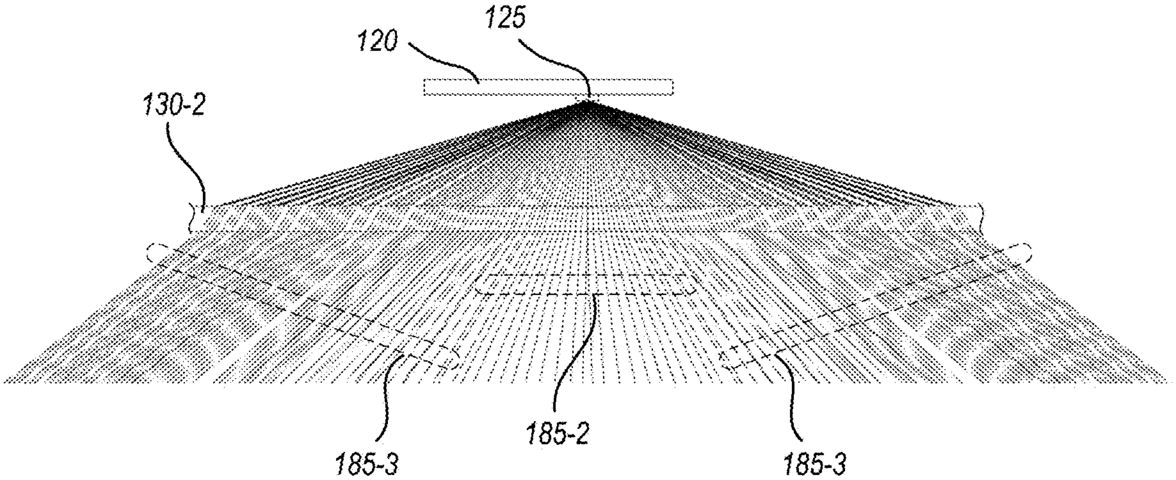
FIG. 7 is a schematic illustration of a section of another area optical cover, in accord with one or more embodiments.

FIG. 7 is a schematic illustration of a section of another area optical cover 130-2. Facets of area optical cover 130-2 are arranged to refract light into a wide distribution and to minimize light directed to nadir (which would ordinarily receive a large proportion of light from a Lambertian source). To achieve this, facets of area optical cover 130-2 are arranged to refract light 185-2 away from nadir, while some of this light, and rays emitted at higher angles, form concentrations of refracted light 185-3 centered around angles of about 50 degrees from nadir. Thus, a far field distribution of light refracted by area optical cover 130-2 has a reduced proportion of light emitted toward nadir than the proportion of light originally emitted toward nadir.

FIG. 8 is a schematic cross-sectional illustration of one embodiment of a light-emitting module 104 with two PCBs 120, and an area optical cover 130-3 having facets that are optimized differently for the light sources provided by PCBs 120. Specifically, on a left-hand side of FIG. 8, facets of area optical cover 130-3 are optimized to produce the wide distribution described in connection with FIG. 7, and on a right-hand side of FIG. 8, facets of area optical cover 130-3 are optimized to produce the narrow distribution described in connection with FIG. 5. Concentrated portions of refracted light 185-1 and 185-3 can be seen, as can refracted light 185-2 that is refracted such that it is less intense at nadir, than as emitted. FIG. 8 demonstrates that a single optical cover can have facets optimized for more than one type of distribution, such that when used with appropriate light sources, far field distributions of various types can be superimposed on one another as desired.

Figure 9:
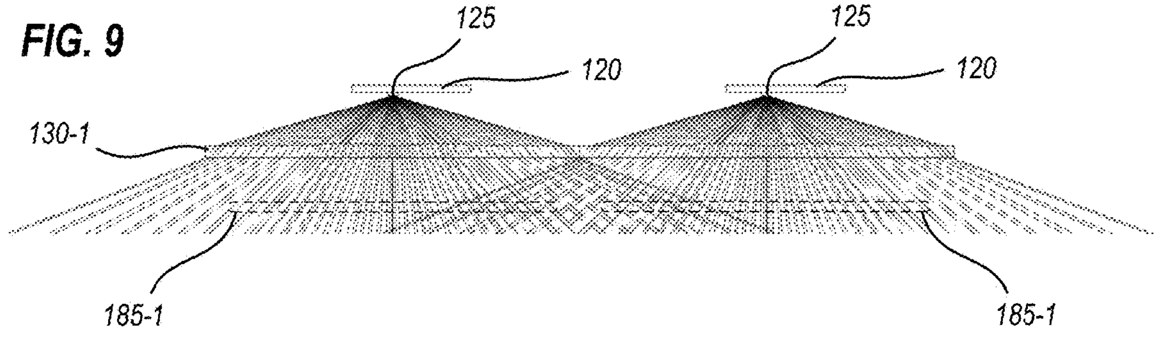
FIG. 9 is a schematic illustration of an embodiment that uses two portions of an area optical cover to produce narrow distributions, in accord with one or more embodiments.

FIG. 9 is a schematic illustration of optical performance of a luminaire that uses both faceted portions of area optical cover 130-1, FIG. 3A, to produce a narrow distribution in the far field. Refracted light 185-1 identified for each portion of area optical cover 130-1, as illuminated by its respective LED 125, is the same refractive light also discussed in connection with FIG. 5, and is more concentrated about nadir than the native Lambertian distribution emitted by each LED 125. Although the distributions illustrated are in the plane of FIG. 9 relative to a single LED 125 as a point source, the distribution can be generalized to what will be produced when area optical cover 130-1 extends in and out of the plane, and LED 125 is representative of a single LED of a row of LEDs extending in and out of the plane.

Figure 10:
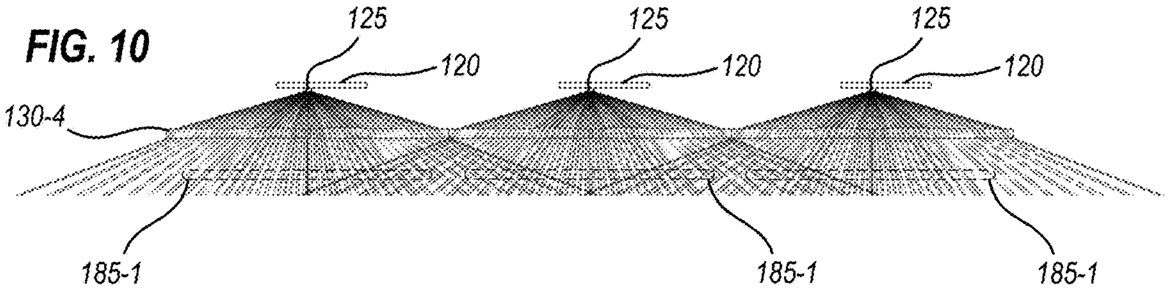
FIG. 10 is a schematic illustration of an embodiment that uses three portions of an area optical cover to produce narrow distributions, in accord with one or more embodiments.

FIG. 10 is a schematic illustration of an embodiment that extends the concepts illustrated in FIG. 9 to three portions of an area optical cover 130-4 to produce a narrow distribution.

The faceting patterns that are repeated twice in area optical cover 130-1 are repeated three times in area optical cover 130-4. Thus, refracted light 185-1 identified for each portion of area optical cover 130-4, as illuminated by its respective LED 125, is the same refractive light also discussed in connection with FIG. 5, and is more concentrated about nadir than the native Lambertian distribution emitted by each LED 125. It will be evident to one skilled in the art that near field light distributions produced by both of area optical covers 130-1 and 130-4 will be strong functions of lateral position (e.g., left to right in the orientations of FIGS. 9 and 10) but in the far field, the narrow characteristics of all of the instances of refracted light 185-1 will merge into a single narrow distribution. That is, as distance from the corresponding fixtures becomes large as compared with a distance between adjacent light sources (e.g., rows of LEDs 125) the angular separation between the adjacent light sources will be negligible compared with the angles subtended by refracted light 185-1 with respect to its respective light source.

Figure 11:
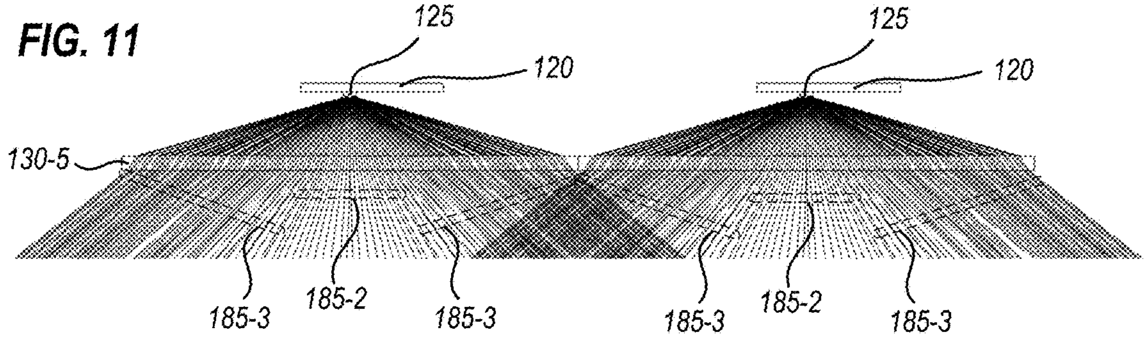
FIG. 11 is a schematic illustration of an embodiment that uses two portions of an area optical cover to produce wide distributions, in accord with one or more embodiments.
Figure 12:
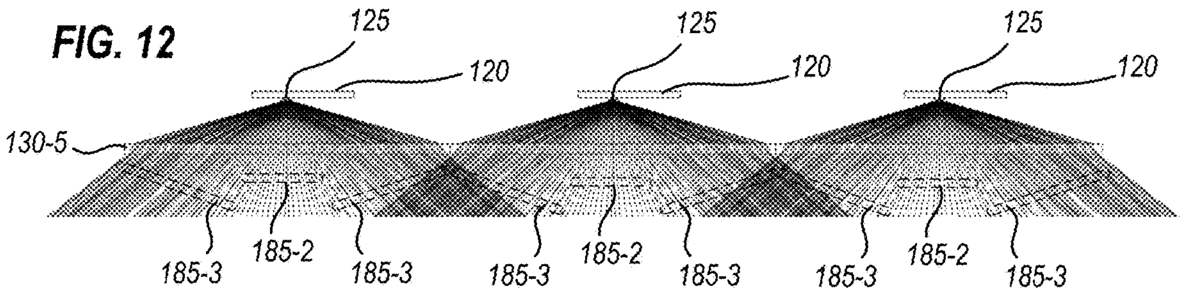
FIG. 12 is a schematic illustration of an embodiment that uses three portions of an area optical cover to produce wide distributions, in accord with one or more embodiments.

FIG. 11 is a schematic illustration of an embodiment that uses two portions of an area optical cover 130-5 to produce bimodal distributions, and FIG. 12 is a schematic illustration of an embodiment that uses three portions of an area optical cover 130-6 to produce bimodal distributions. The faceting patterns that are repeated twice in area optical cover 130-5 are repeated three times in area optical cover 130-6, and are the same as shown in FIG. 7. Thus, refracted light 185-2 identified for each portion of area optical covers 130-5 and 130-6, as illuminated by their respective LEDs 125, is refracted so as to minimize light directed to nadir. Refracted light 185-3, identified on both sides of the same portions, is more concentrated about angles that are about 50 degrees from nadir. Similar to the cases discussed in connection with FIGS. 9 and 10, near field light distributions produced by the embodiments of FIGS. 11 and 12 will be strong functions of position, but in the far field, the concentrations of refracted light 185-3 at high angles will merge into concentrations of light at the same angles. When comparing the appearances of FIGS. 9 and 10 with appearances of FIGS. 10 and 11, it is to be understood that the characterizations of distributions as “wide,” “narrow,” or “bimodal” have to do with directions toward which the refracted rays are concentrated, and not with rays having the highest or lowest angles shown for each distribution.

As suggested by the series of illustrations FIGS. 5, 9 and 10 and FIGS. 6, 11 and 12, there is no actual limit to a number of light sources for which an appropriate area optical cover can be optimized. That is, housings 110 can be modified to include any numbers of PCBs 120 as linear light sources, and area optical covers 130 can be modified to refract light from any such sources. While there will be some overlap of high angle light emitted from one light source onto facets arranged to refract light from an adjacent source, when the adjacent set of facets is at a sufficiently high angle from an unintended light source (perhaps 50 degrees or greater) the amount of light received from a Lambertian source will be small enough to be negligible. This is consistent with all facets within at least 30 degrees of nadir from the light source being optimized to provide a selected, far field light distribution. For example, a far field light distribution may be selected as a narrow far field distribution (e.g., concentrated into a single distribution peak that is 10, 12, 15, or 20 degrees wide, full width half maximum); a wide far field distribution (e.g., concentrated into a single distribution peak that is 40, 45, 50, 55, 60, 65, or 70 degrees wide, full width half maximum); a bimodal or “batwing” far field distribution (e.g., concentrated into two distribution peaks that are aimed in different directions, each distribution peak being 10, 12, 15 or 20 degrees wide). Collimated and/or asymmetric distributions are also possible using the techniques described above. Each of the peak widths noted above may be characterized as representing the full width of the peak at half the maximum intensity, but it is possible in some cases to provide sharper or more diffuse peaks. Of course, each of the distribution peak widths noted above are exemplary only, and values between or outside the specifically named peak widths, are possible. It is also possible to provide linear light sources at differing angles (i.e., not simply all parallel with one another), or to provide a mixture of linear and one or more discrete light sources, and to provide features in an area optical cover 130 to appropriately refract the light from all such sources.

The foregoing is provided for purposes of illustrating, explaining, and describing various embodiments. Upon reading and comprehending the present disclosure, one of ordinary skill in the art will readily recognize many alternative features, constructions, modifications and equivalents to the embodiments shown in the drawings, which may be made and/or used without departing from the spirit of what is disclosed. Different arrangements of the components depicted in the drawings or described above, as well as additional components and steps not shown or described, are possible. Certain features and subcombinations of features disclosed herein are useful and may be employed without reference to other features and subcombinations. Additionally, well-known elements have not been described in order to avoid unnecessarily obscuring the embodiments. Embodiments have been described for illustrative and not restrictive purposes, and alternative embodiments will become apparent to readers of this patent. Accordingly, embodiments are not limited to those described above or depicted in the drawings, and various modifications can be made without departing from the scope of the claims below. Embodiments covered by this patent are defined by the claims below, and not by the brief summary and the detailed description.

What is claimed is:

1. An area optical cover for a linear light source, the linear light source extending along an axial direction, the area optical cover comprising:

a. a substantially planar optic body through which light from the linear light source passes, the substantially planar optic body comprising a length aligned with the axial direction, a width transverse to the length, and an inner surface on a top side of the substantially planar optic body and an outer surface on a bottom side of the substantially planar optic body, wherein both the inner surface and the outer surface extend along and across the length and width of the substantially planar optic body and wherein the outer surface lies entirely in a plane defined by the length and the width of the substantially planar optic body;

b. coupling portions on opposing sides of the substantially planar optic body and configured to engage with corresponding coupling features of a luminaire housing, wherein:

a plurality of facets are provided on at least one portion of the inner surface;

each of the plurality of facets provided on the at least one portion of the inner surface forms a refractive surface that is configured to refract a corresponding portion of light from the linear light source, and a return surface that connects the refractive surface with a refractive surface of an adjacent facet;

when the linear light source is positioned at an installation height offset from the inner surface and so as to emit light towards the at least one portion of the inner surface, all facets within at least 30 degrees of nadir from the linear light source provide a selected light distribution; and when the area optical cover is coupled to the luminaire housing, the linear light source is located above the top side of the substantially planar optic body such that light from the linear light source is received by the top side of the substantially planar optic body and exits the area optical cover as refracted light only through the bottom side of the substantially planar optic body.

2. The area optical cover for a linear light source of claim 1, wherein:

the selected light distribution comprises a wide far field light distribution comprising a single distribution peak that is 40 to 70 degrees wide.

3. The area optical cover for a linear light source of claim 1, wherein:

the selected light distribution is asymmetric with respect to nadir.

4. The area optical cover for a linear light source of claim 1, wherein:

the selected light distribution is symmetric with respect to nadir.

5. The area optical cover for a linear light source of claim 1, wherein:

a peak height of any facet does not exceed 1.3 times a valley height between any adjacent two facets.

6. The area optical cover for a linear light source of claim 1, wherein:

the facets are arranged to align with one or more rows of LEDs of the linear light source.

7. The area optical cover for a linear light source of claim 1, wherein:

the outer surface is optically smooth.

8. The area optical cover for a linear light source of claim 1, wherein:

the outer surface comprises a textured surface.

9. The area optical cover for a linear light source of claim 1, wherein:

the substantially planar optic body comprises scattering sites configured to diffuse the light when it passes through the area optical cover.

10. The area optical cover for a linear light source of claim 9, wherein:

the substantially planar optic body comprises a first material and wherein the scattering sites comprise a second material that is different than the first material.

11. The area optical cover for a linear light source of claim 10, wherein:

a weight of the second material is less than about 2% of a total weight of the area optical cover.

12. The area optical cover for a linear light source of claim 1, wherein:

the substantially planar optic body includes air bubbles configured to diffuse the light when it passes through the area optical cover.

13. The area optical cover for a linear light source of claim 1, wherein:

a thickness of the substantially planar optic body is at least 2 mm.

14. The area optical cover for a linear light source of claim 1, wherein:

each of the plurality of facets is configured to refract a corresponding portion of the light toward the normal direction, as compared with an original propagation direction of the corresponding portion of the light.

15. The area optical cover for a linear light source of claim 1, wherein:

each of the plurality of facets is configured to refract a corresponding portion of the light away from the normal direction, as compared with an original propagation direction of the corresponding portion of the light.

16. The area optical cover for a linear light source of claim 1, wherein:

the substantially planar optic body comprises a plurality of scattering sites that are configured to provide no more than 20 degrees of diffusion to the light.

17. The area optical cover for a linear light source of claim 1, wherein:

the selected light distribution comprises a bimodal far field light distribution comprising two distribution peaks that are each 10 to 20 degrees wide.

18. The area optical cover for a linear light source of claim 1, wherein, when the area optical cover is coupled to the luminaire housing, the substantially planar optic body extends in a plane substantially parallel to the axial direction of the linear light source.

19. The area optical cover for a linear light source of claim 18, wherein the plane is substantially horizontal.

20. The area optical cover for a linear light source of claim 1, wherein the at least one portion of the inner surface comprises a first portion of the inner surface and a second portion of the inner surface, and wherein the plurality of facets comprises a first plurality of facets provided on the first portion of the inner surface and a second plurality of facets provided on the second portion of the inner surface.

21. The area optical cover for a linear light source of claim 1, wherein, when the area optical cover is coupled to the luminaire housing, the plurality of facets extends in the axial direction of the linear light source.

22. The area optical cover for a linear light source of claim 1, wherein the plurality of facets are provided on the inner surface across substantially the entire width of the substantially planar optic body.

* * * * *